United States Patent
Adams et al.

[11] Patent Number: 6,078,288
[45] Date of Patent: Jun. 20, 2000

[54] PHOTONICALLY CONTROLLED ANTENNA ARRAY

[75] Inventors: Stephen B. Adams, Mont Vernon; David D. Liu, Amherst; David P. Charette, Hudson, all of N.H.; Brian J. Edward, Pompey; Bryan L. Cleaveland, Baldwinsville, both of N.Y.; Bruce R. Lanning, Littleton; Robert E. Munson, Boulder, both of Colo.

[73] Assignee: Lockheed Martin Corporation, Bethesda, Md.

[21] Appl. No.: 09/195,506

[22] Filed: Nov. 18, 1998

Related U.S. Application Data

[60] Provisional application No. 60/066,739, Nov. 21, 1997.

[51] Int. Cl.[7] .............................. H01Q 3/22; H01Q 13/00
[52] U.S. Cl. .............................. 342/372; 343/778
[58] Field of Search .................... 342/372, 374, 342/375, 54; 343/762, 772, 778, 844, 846

[56] References Cited

U.S. PATENT DOCUMENTS

| | | | |
|---|---|---|---|
| 4,636,794 | 1/1987 | McGinn | 342/368 |
| 4,751,513 | 6/1988 | Daryoush et al. | 373/700 MS |
| 5,515,066 | 5/1996 | Kim et al. | 343/895 |
| 5,751,248 | 5/1998 | Thaniyavarn | 342/368 |

*Primary Examiner*—Thomas H. Tarcza
*Assistant Examiner*—Fred H. Mull
*Attorney, Agent, or Firm*—Holme Roberts & Owen LLP

[57] ABSTRACT

A photonically controlled antenna array is made of a plurality of stacked light waveguides made of a material such as silicon whereon each of which one or more photonically controlled antenna elements are mounted. Light is injected into ones of the light waveguides and reflects therein until it is absorbed by the antenna elements mounted thereon due to the higher refractive index of silicon. When the photonically controlled antenna elements are illuminated they are switched to a conductive state and can transmit and receive electromagnetic signals. When no light is injected into the light waveguide the photonically controlled antenna elements are not illuminated and are in a non-conductive state wherein they cannot receive or transmit electromagnetic signals. One edge of each of the light waveguides is adjacent to a ground plane, and the antenna elements on each light waveguide are spaced from said ground plane a distance equal to a quarter wavelength at the frequency at which each of said photonically controlled antenna elements is designed to operate. The antenna elements radiate and receive signals in a direction parallel to said waveguides that is opposite to said ground plane.

9 Claims, 3 Drawing Sheets

PHOTONICALLY CONTROLLED ANTENNA ARRAY

RELATED APPLICATION

This application claims the benefit of U.S. Provisional Patent Application Ser. No. 60/066,739, entitled "A 1–18 Photonically Reconfigurable Phased Array Antenna", filed on Nov. 21, 1997.

GOVERNMENT CONTRACT

The U.S. Government has a paid-up license in this invention and the right in limited circumstances to require the patent owner to license others on reasonable terms as provided by the terms of Contract N00014-95-C-0166 awarded by the Office of Naval Research.

FIELD OF THE INVENTION

This invention relates to phased array antennas, and more particularly to antenna arrays made up of photonically controlled antennas.

BACKGROUND OF THE INVENTION

In the prior art, photo-conductive antennas activated by laser pulses are known. The antenna elements are fabricated from a photo-conductive semiconductor material that becomes conductive when illuminated by a light source, such as a laser, and thus can serve as a metal-like electromagnetic radiator/receiver. When the laser source is turned off, the photo-conductive antenna element becomes non-conductive. In the non-conductive state the antenna element cannot transmit or receive electromagnetic waves. In this non-conductive state the antenna element gives no interference to nearby active antenna elements and are also immune from electromagnetic detection.

To achieve multi-octave frequency coverage with a phased array antenna, multiple layers of planar antenna elements, with each layer dedicated to an octave bandwidth, have been taught to circumvent the problems associated with each antenna element having to cover the entire frequency spectrum. To prevent the formation of extraneous grating lobes at the highest frequency of antenna array operation, the radiating antenna elements must be closely spaced. This restricts the physical size of the antenna element, and the apparatus for optically illuminating the photo-conductive, semiconductor, antenna element, which in-turn limits its performance at the lower frequencies of operation.

These designs, however, are based on conventional metallic conductor elements and the interaction between the layers proves detrimental to performance. Array designs have also been taught which place portions of metallic conductors on a substrate and interconnect these portions to form a dipole or patch radiator resonant at the frequency of operation. The interconnect function can be performed by an optically controlled switch. Such dipoles or patches, however, are inherently narrow in bandwidth. A departure in operating frequency by more than a few percent requires altering the switch states. Wide instantaneous bandwidth operation is unachievable, and such antenna elements provide interference to other nearby antenna elements in the array.

Thus, there is a need in the art for an array of antenna elements in which individual antenna elements operate without interfering with other nearby antenna elements in the array, while at the same time the array of antenna elements is extremely broadband.

SUMMARY OF THE INVENTION

The foregoing needs of the prior art are satisfied by the present invention. A small, extremely broadband array of antenna elements is disclosed wherein individual antenna elements do not substantially interfere with other antenna elements in the array. A small optical switch is also disclosed which is used to selectively illuminate photo-conductive antenna elements in the array to switch them between their conductive and non-conductive states.

The antenna elements are fabricated from a photo-conductive semiconductor material, such as silicon, that becomes conductive when illuminated by a light source and thus can serve as a metal-like electromagnetic antenna. A light waveguide is used to mount the photo-conductive antenna elements and is also used to selectively illuminate and switch the antenna elements between their conductive and non-conductive states. The photo-conductive antenna elements mounted on the light waveguides form antenna array panels, and multiple panels are stacked in a compact manner, and share a common exposure aperture. Each antenna array panel is designed to operate at a certain bandwidth section as a part of the total broad bandwidth of the array of antenna elements. The whole array of antenna elements offers an extremely broad bandwidth capability, while retaining the advantages of a narrow bandwidth performance.

In addition, the antenna element array panels can be stacked very compactly which reduces side, grating lobes; permits sharing of the exposure area/radome, dramatically reduces the system space-extension requirement, and decreases the radar signature. In accordance with the teaching of the invention the stacked antenna element array panels are mounted perpendicular to the radome and a ground plane.

The photo-conductive, silicon antenna elements on the light waveguide of each antenna array panel are illuminated using a light waveguide, or optical tank, selectively fed with continuous wave laser light which provides uniform and efficient illumination of the antenna elements mounted on the array panel. The light tank waveguide is a thin slab of glass or sapphire with dielectric coated edges providing a mirror action to laser light in the substrate, and on which the photo-conductive semiconductor antenna elements are mounted. Laser illumination is delivered to the glass or sapphire by optical fibers and, due to reflection from the RF compatible, dielectric coated edges, the laser beam injected inside the optical tank reflects therein with little loss until absorbed by the photo-conductive, silicon, antenna elements.

With the photo-conductive silicon antenna elements bonded to the light waveguide, the higher refractive index of silicon makes the total reflection therein break down, and thus allows the laser beam to leak through the surface of the waveguide into the silicon antenna elements. When this occurs the silicon antenna elements becomes conductive and functions as a metallic antenna element to receive and radiate electromagnetic energy. When illumination is removed from a light waveguide, the photonically controlled antenna elements thereon appear as insulators and are electrically transparent to electromagnetic radiation being transmitted by the antenna elements of other array panels, and thus give no interference to nearby active antenna elements.

With each antenna array panel designed to operate over an octave bandwidth, and by stacking multiple antenna array panels with each panel designed to operate over a different octave bandwidth, an extremely wide bandwidth antenna array is achieved. By phasing the RF signals applied to the antenna elements, phased array operation is achieved and the main lobe of the antenna elements can be electronically steered.

DESCRIPTION OF THE DRAWING

The invention will be better understood upon reading the following Detailed Description in conjunction with the drawing is which.

DETAILED DESCRIPTION

Figure 1:
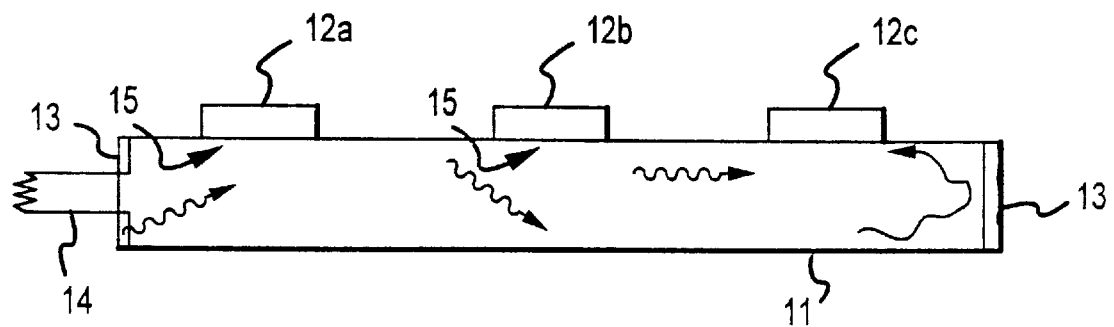
FIG. 1 shows a simplified side view of a glass substrate light waveguide with photo-conductive, silicon antenna elements thereon and how light injected into the light waveguide is reflected until absorbed by the antenna elements.

In FIG. 1 is shown a simplified side view of a part of an antenna array consisting of photo-conductive antenna elements 12a, 12b and 12c. Typically, however, there would be more than three antenna elements 12. The antenna elements 12a, 12b and 12c are made of a photo-conductive material, such as silicon and they are bow tie antennas. The antenna elements 12a, 12b and 12c are attached to a thin glass or sapphire sheet 11 the edges 13 of which are coated with a layer of a dielectric material, in a manner well known in the art, to make them reflective. To attach antenna elements 12a, 12b and 12c to glass or sapphire sheet 13 an optical cement of types known in the art is used.

The thin glass or sapphire sheet 11 makes up a light waveguide that is used to couple light energy to photo-conductive silicon antenna elements 12a, 12b and 12c to switch them between their conducting and non-conducting states in accordance with the teaching of the present invention. When photo-conductive silicon antenna elements 12a, 12b and 12c are illuminated, electron/hole pairs are created and the silicon behaves as a conductor. In this manner antenna elements 12a, 12b and 12c are switched to their on or conducting state wherein they can receive and transmit electromagnetic energy. When light energy is removed from thin glass or sapphire sheet, light waveguide 11, silicon antenna elements 12a, 12b and 12c are in their non-conducting state, appear as insulators, are electrically transparent, and thus give no interference to nearby active antenna elements.

To perform this function of switching antenna elements 12a, 12b and 12c between their conducting and non-conducting states, light is applied to the photo-conductive, silicon antenna elements using a light waveguide 11 which is the thin glass or sapphire sheet 11. Light energy for this purpose is obtained from a laser source, not shown, and is applied to one end of light waveguide 11 with optical fibers as shown. The front and back edges 13 of light waveguide 11 are coated with a dielectric material, in a manner well known in the art, to make them reflective. Thus, light waveguide 11 is an optical cavity. The light energy from the laser is carried via optical fibers 14, the terminating end of which are abutted against one end of light waveguide 11. Multiple optical fibers 14 are used, spaced along the end of light waveguide 11, to insure uniform and efficient injection of light into the waveguide.

The laser light injected into light waveguide 11 is reflected therein until the light is absorbed by antenna elements 12a, 12b and 12c. Optical switches (not shown) are used to apply and remove laser light to optical fibers 14 in a manner well known in the art.

As the light energy traverses the optical cavity of light waveguide 11, the higher refractive index of silicon antenna elements 12a, 12b and 12c makes the total reflection break down, and allows the light energy to leak out of light waveguide 11 into silicon antenna elements 12a, 12b and 12c. When illuminated by the escaping light energy the silicon antenna elements 12a, 12b and 12c become electrically conductive. To improve absorption of light by silicon antenna elements 12a, 12b and 12c a very thin layer of metallic pads, (not shown) made of aluminum or gold, are placed between antenna elements 12a, 12b and 12c and the surface of light waveguide 11 at 15. In this manner lower levels of optical energy are needed for light waveguide 11 to activate antenna elements 12a, 12b and 12c to their conductive states. As is known in the art the electromagnetic energy radiated from these antenna elements 12 has a toroid pattern and radiates horizontally and perpendicular to light waveguide 11.

Figure 2:
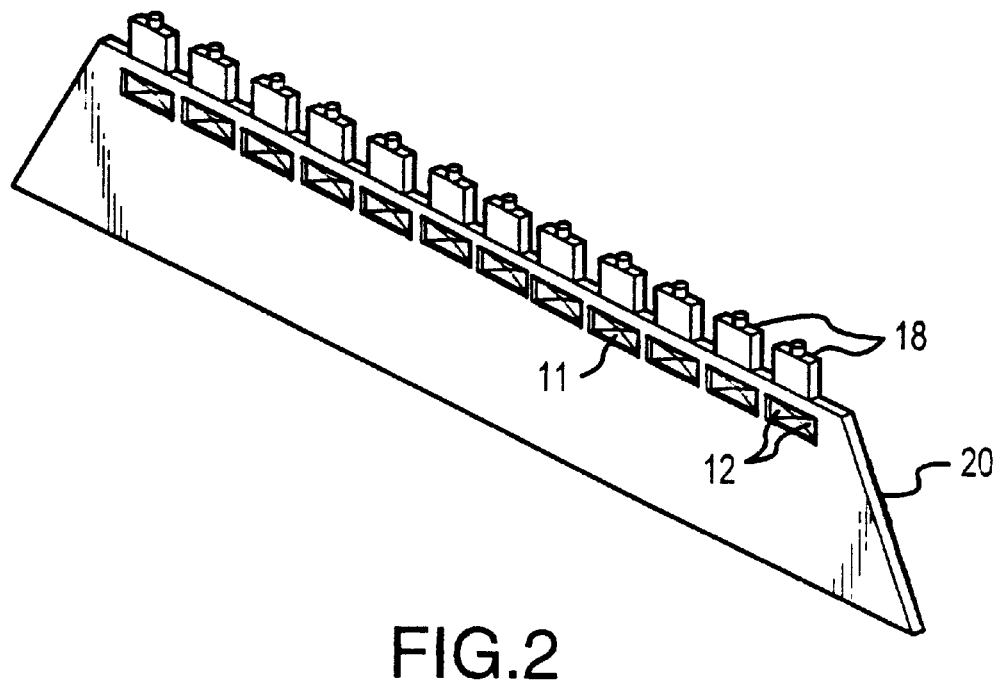
FIG. 2 shows a three dimensional view of a light waveguide with photo-conductive antenna elements thereon.

FIG. 2 shows a plurality of photo-conductive, silicon antenna element 12 mounted on a single mounting frame 20 which is made of fiberglass. Light waveguides 11 with antenna elements 12 thereon are mounted on mounting frame 20. The antenna elements 12 shown in this Figure are bow tie antennas, which are each connected to a compensated balun feed 18 fabricated using conventionally metallic conductors and soldered thereto using indium at the contact tip of each triangle at the middle, narrow point of the bow tie antenna. The bowtie antennas are fabricated from standard 10.2 cm (4 inch) diameter wafers with a thickness of 0.64 mm (0.025 in). Using signal delay and switching techniques, not shown or described herein, but well known in the phased array antenna art, a common signal is applied to antenna elements 12 with a time/phase difference applied to each individual antenna element to electronically steer the direction in which the main lobe of the antenna element on a light waveguide will transmit. More than one mounting frames 20 with multiple antenna elements 12 thereon are stacked together to create an extremely broadband antenna array, as shown in FIG. 3 and described with reference to that Figure.

Figure 3:
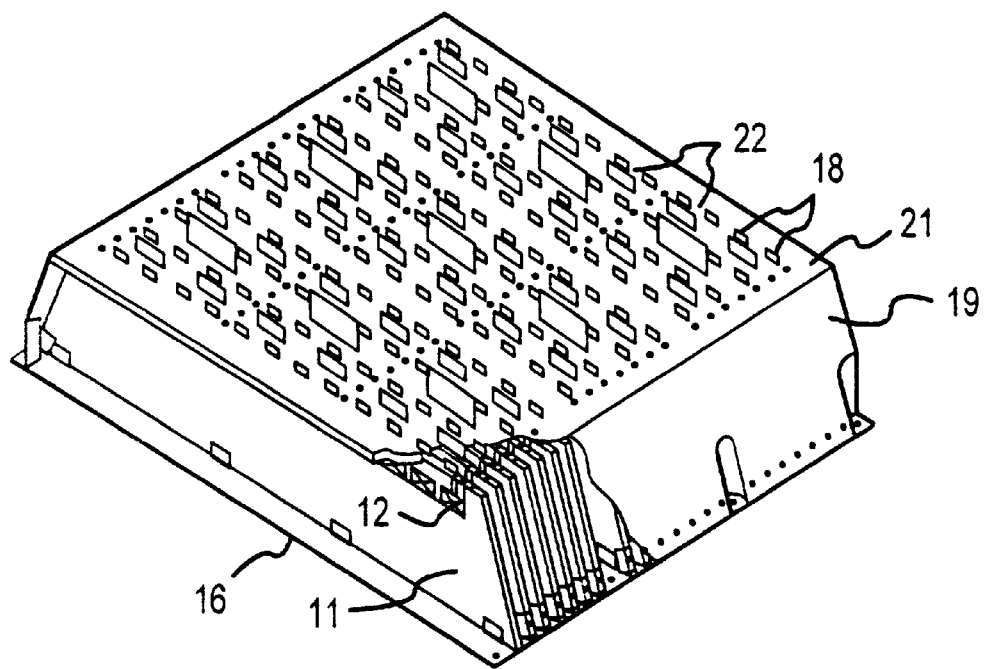
FIG. 3 shows a three dimensional view of a stack of individual light waveguides making up a broadband antenna array where the light waveguides are those shown in FIG. 2 and are mounted perpendicular to the radome and a ground plane.

With the antenna elements 12 on each optical mounting frame 20 being designed to operate over a different, adjacent band of approximately an octave frequency range, the entire stack of mounting frames 20, shown in FIG. 3, implements a low-profile, compact, extremely broadband, phased antenna array capable of multi-octave frequency coverage.

In FIG. 3 is shown a side view of a broadband antenna array comprised of multiple mounting frames 20 stacked together per the teaching of the present invention. In this Figure the stacked mounting frames 20 are oriented perpendicular to the radome 16 and ground plane 21.

As mentioned hereinabove, the energy pattern radiated from antenna elements 12 is both perpendicular and horizontal to the plane of mounting frames 20 with light waveguides 11 as is well known in the antenna art. In this configuration of stacked mounting frames 20 it is the energy radiated parallel to the mounting frames and through radome 16 that is of interest. To facilitate radiating energy in this direction ground plane 17 is used to reflect rear lobe radiated electromagnetic energy impinging on the ground plane in a manner that is well known in the antenna art.

The front of the antenna array is in the direction of radome 16 which serves a function well known in the antenna art. One or more mounting frames 20 with their antenna elements 12 are designed to cover the frequency band from 1–2 Gigahertz, one or more mounting frames 20 with their antenna elements 12 are designed to cover the frequency band from 2–4 Gigahertz, one or more mounting frames 20 with their antenna elements 12 are designed to cover the frequency band from 4–8 Gigahertz, and one or more mounting frames 20 with their antenna elements 12 are designed to cover the frequency band from 8–16 Gigahertz. At the 1–2 Gigahertz band the wavelength is longest and, accordingly, the size of the photonically controlled antenna elements 12 on that layer are largest, and spaced furthest from each other. Conversely, at the 8–16 Gigahertz band the wavelength is shortest and, accordingly, the size of the antenna elements 12 on that layer are smallest, and spaced closest to each other.

Figure 4:
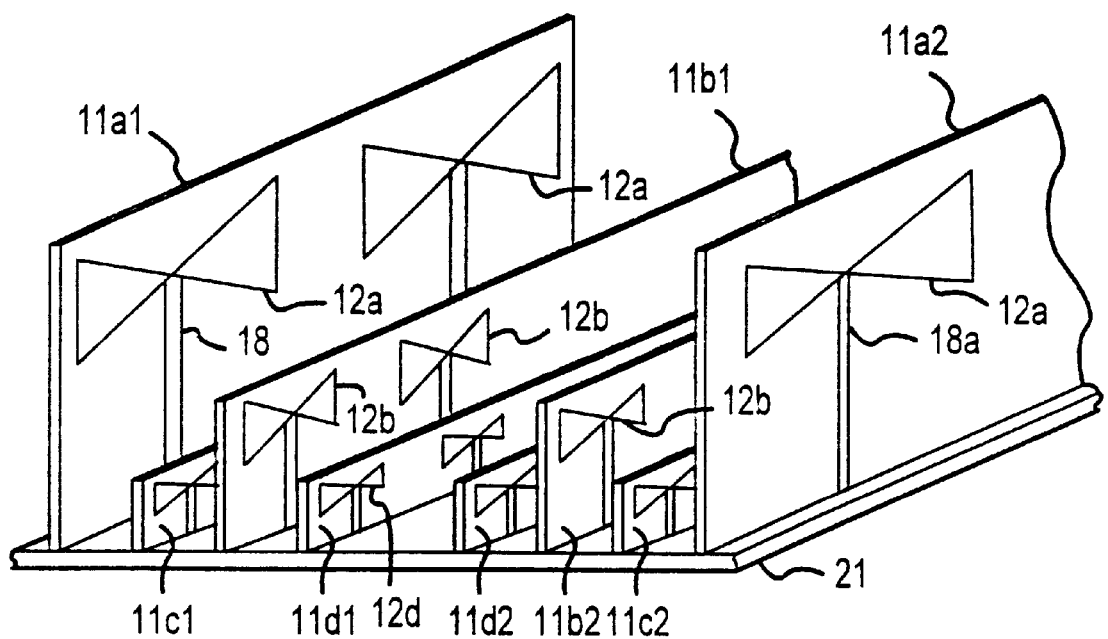
FIG. 4 shows an exploded view of a portion of the antenna array shown in FIG. 3.

In accordance with the teaching of the invention the spacing between mounting frames 20 is only partially dependent on wavelength as is described in more detail with respect to FIG. 4, but the spacing of antenna elements 12 on each mounting frames 20 from ground plane 21 in FIG. 3 is dependent on the wavelength. The antenna elements 12 on each mounting frame 20 are spaced a quarter wavelength from ground plane 21 at the center of their operating frequency band for reasons well known in the art to reflect rear radiation lobes. This is better shown in FIG. 4 and described with reference thereto.

Each mounting frame 20 is driven by laser light from an optical fiber 22. A balun feed 18 is used to apply RF signals to and receive RF signals from each antenna element 12.

FIG. 4 shows an exploded view of a small portion of the antenna array that is shown in FIG. 3. The light waveguides 11 and antenna elements 12 thereon are shown in an inverted orientation from FIG. 3 to better see the details of spacing of light waveguides 11 and antenna elements 12 from each other. Thus, not all the antenna elements 12 on these light waveguides 11, and not all of the light waveguides 11 are shown. Only enough is shown in FIG. 4 to understand the invention. To further avoid cluttering the drawing the fiber optic cables and balun feeds are not shown. In addition, to avoid confusion, the mounting frames 20 are also not shown in this Figure. The radome 16, antenna array frame 19 and optical fibers 14 are also not shown. Light waveguides 12 are shown mounted perpendicular to ground plane 21. As described previously, the size and spacing of bow tie antenna elements 12 are dependent on the frequency at which they will operate. For example, the antenna elements 12$a$ on light waveguides 11$a$1 and 11$a$2 are designed to operate in the band of 1–2 Gigahertz so their physical size is designed at 1.5 Gigahertz. In addition, antenna elements 12$a$ on each of light waveguides 11 are spaced based on the RF frequency in a manner well known in the antenna art. Further, light waveguides 11$a$1 and 11$a$2 are spaced so that the antenna elements 12$a$ on waveguide 11$a$1 are spaced a distance apart from antenna elements 12$a$ on light waveguide 11$a$2 in a manner well known in the antenna art. As can be better seen in FIG. 4, antenna elements 12$a$ are spaced a quarter wavelength above ground plane 21 so that the rear radiation lobe from antenna elements 12$a$ will be reflected forward in phase with the forward lobe in a manner well known in the antenna art.

Similarly, light waveguides 11$b$1 and 11$b$2 and the antenna elements 12$b$ thereon; light waveguides 11$c$1 and 11$c$2 and the antenna elements 12$c$ thereon; and light waveguides 11$d$1 and 11$d$2 and the antenna elements 12$d$ thereon are all spaced in the same manner as described above for light waveguides 11$a$1 and 11$a$2 and antenna elements 12$a$ thereon. Balun feeds 18 (not shown) are used to apply radio frequency (RF) energy to and receive RF energy from all of antenna elements 12 in FIG. 4, but only a few representative antenna elements 12 are shown marked with the number 18.

In FIG. 4 the height of light waveguides 11 above ground plane 21 are all different based on the band in which the antenna elements thereon are operating.

Partitioning the full frequency range into octave band layers permits simultaneously satisfying two competing requirements. Within each optical waveguide 11 the antenna elements 12 must be located sufficiently close together to support phased array beam steering without the formation of extraneous grating lobes. This antenna spacing requirement is established for the upper frequency extreme of a band. In contrast, sufficient area must also be allocated for each antenna element 12 so that they operate properly at the lowest frequency extreme of that band. By orienting the stacked light waveguides 11 perpendicular to radome 16 as shown in FIG. 3, and spaced from ground plane 21 on the individual waveguides 11 as previously described, the antenna elements 12 on each waveguide 11 can be spaced to minimal distance from antenna elements 12 on other waveguides 11 and thereby reduce grating lobes. Octave coverage bands will then yield sufficient wavelength element spacing, at the lower frequency extreme, sufficient to realize adequate radiation properties and impedance behavior when using an antenna design such as the bow tie antenna element illustrated in FIG. 2.

Because this novel phased antenna array design features a multi-octave operating bandwidth and an instantaneous bandwidth on the order of an octave, it can support short pulse/wide bandwidth radar waveforms for target discrimination, frequency agility for low probability of intercept radar and communication operations, and the large frequency spreads required for electronic surveillance/ electronic warfare functions. The phased antenna array is also dynamically re-configurable. An arbitrary size portion of the antenna array can be selected for a desired function at the appropriate frequency span, while the remainder of the antenna array can be independently operating at a different frequency in a time sharing fashion. The percent of the array allocated to a function can be altered at will. In addition, the layered design also features a low-profile which can conform to complex shapes, such the surface of an aircraft. For aircraft deployment this means the antenna array can be accommodated at various sites on the airframe. Further, when the phased array is not being used, all the radiating elements may be made transparent to electromagnetic waves. This enables the achievement of a low radar cross-section.

While what has been disclosed herein is the preferred embodiment of the invention numerous changes may be made without departing from the spirit and scope of the invention.

What is claimed is:

1. An array of photonically controlled antenna elements comprising:

a plurality of light waveguides that are stacked together next to each other;

at least one photonically controlled antenna element bonded to the surface of each of said light waveguides;

means for applying light energy to individual ones of said light waveguides, said light energy being reflected in said individual ones of said light waveguides until being absorbed by said photonically controlled antenna elements thereon through the surface of each of said light waveguides;

wherein said photonically controlled antenna elements on ones of said light waveguides are switched to a conductive state wherein they can transmit and receive electromagnetic energy in a direction parallel to said light waveguides when said light energy is applied to said ones of said light waveguide by said applying means, and said photonically controlled antenna elements are switched to a non-conductive state wherein they cannot transmit and receive electromagnetic energy when said light energy is removed from said ones of said light waveguides by said applying means; and a ground plane, wherein a first edge of each of said light waveguides are adjacent to said ground plane, and the photonically controlled antenna elements on each of said light waveguides are spaced from said ground plane a distance equal to a quarter wavelength of the frequency at which each of said photonically controlled antenna elements is designed to operate.

2. The invention in accordance with claim 1 wherein individual ones of said light waveguides making up said stack of light waveguides are designed to operate over different frequency ranges, said plurality of light waveguides in said stack thereby making up an extremely broadband antenna array.

3. The invention in accordance with claim 2 wherein each of said light waveguides comprises a piece of light conductive material such as glass or sapphire on one surface of which said photonically controlled antenna elements are bonded.

4. The invention in accordance with claim 3 wherein each of said light waveguides further comprise reflection means placed on surfaces of said light waveguides to assist in reflecting light inserted within said light waveguides by said light energy applying means until said light is absorbed by said photonically controlled antenna elements mounted thereon through the surface of said light waveguides.

5. The invention in accordance with claim 4 further comprising means for facilitating the transfer of light energy reflecting inside each of said light waveguides to said photonically controlled antenna elements mounted thereon so that said photonically controlled antenna elements can change to their conducting state when illuminated by a lesser amount of light energy in said light waveguide.

6. The invention in accordance with claim 5 wherein a signal is applied to said photonically controlled antenna elements on each of said light waveguides to be transmitted, and the portion of said last mentioned signal applied to ones of said last mentioned photonically controlled antenna elements are delayed in time or phase so that they cooperate as a phased array antenna that can electronically steer the direction in which said last mentioned signal is radiated as electromagnetic energy.

7. The invention in accordance with claim 6 wherein ones of said stacked plurality of light waveguides can operating independently of others of said stacked plurality of light waveguides, so some photonically controlled antenna elements can be transmitting signals while other photonically controlled antenna elements are receiving signals, and those antenna elements that are transmitting signals can be transmitting different signals and in different directions.

8. The invention in accordance with claim 7 wherein said light waveguides are mounted perpendicular to said ground plane.

9. The invention in accordance with claim 1 wherein said light waveguides are mounted perpendicular to said ground plane.

* * * * *